July 18, 1950     J. E. DUFRESNE     2,515,953
RODDING MACHINE
Filed Jan. 8, 1947     2 Sheets-Sheet 1
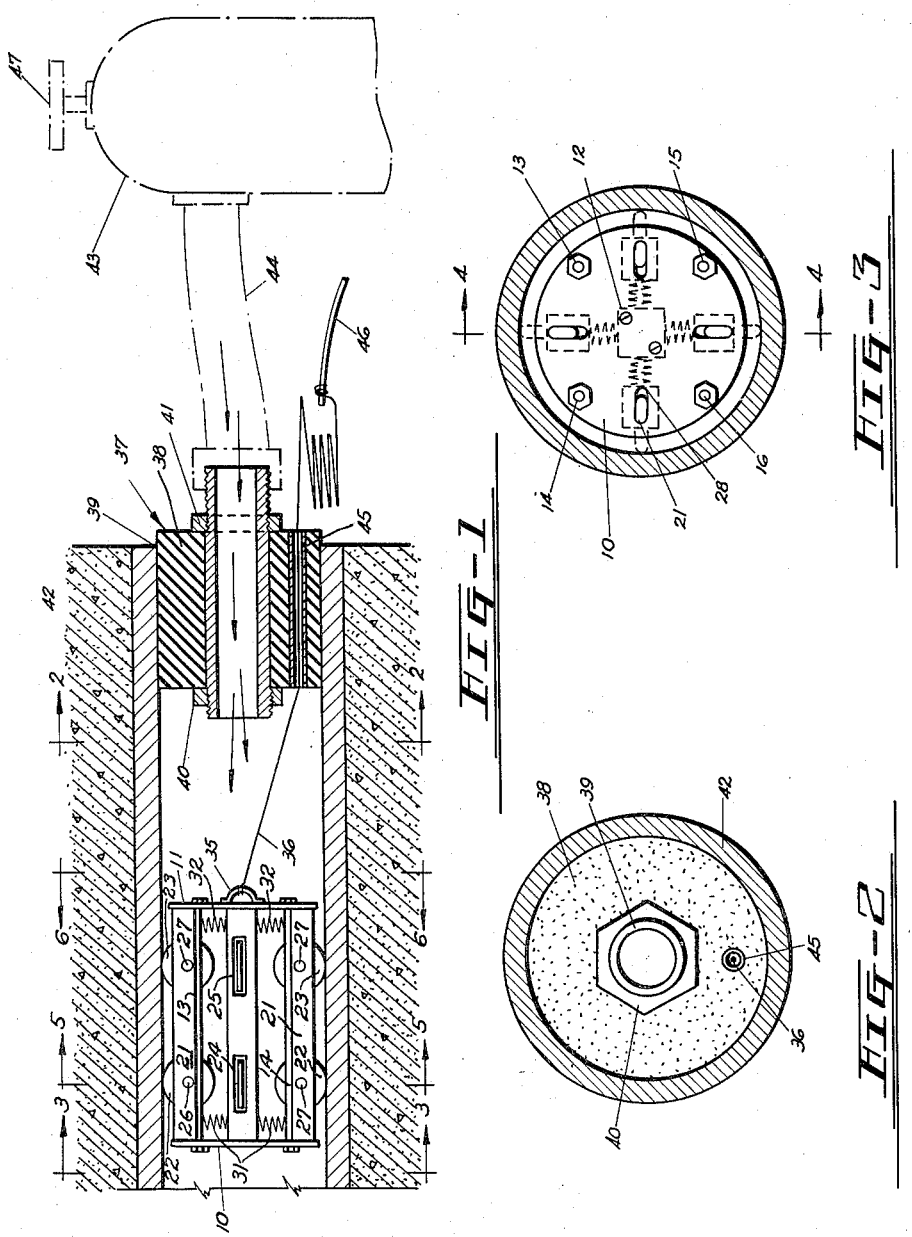
INVENTOR
Joseph Eugene Dufresne
by E. M. Fetherstonhaugh
ATTORNEY July 18, 1950 J. E. DUFRESNE 2,515,953
RODDING MACHINE
Filed Jan. 8, 1947 2 Sheets-Sheet 2
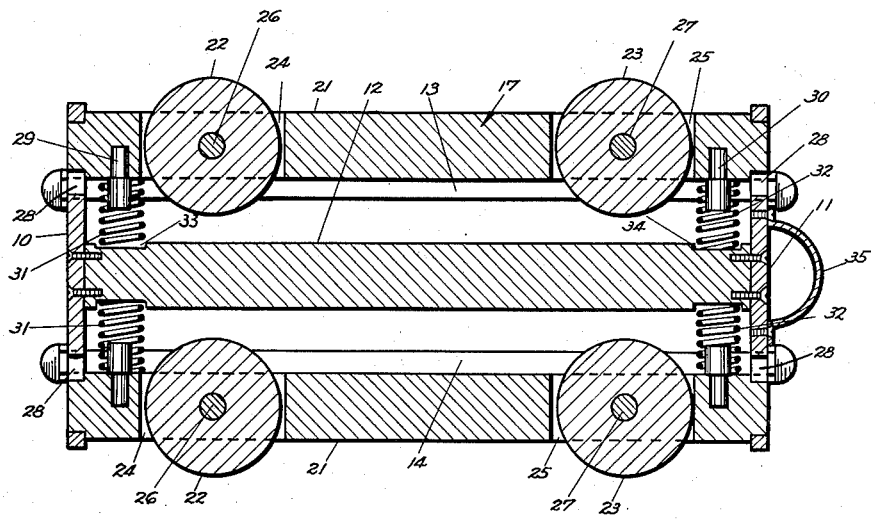
FIG-4
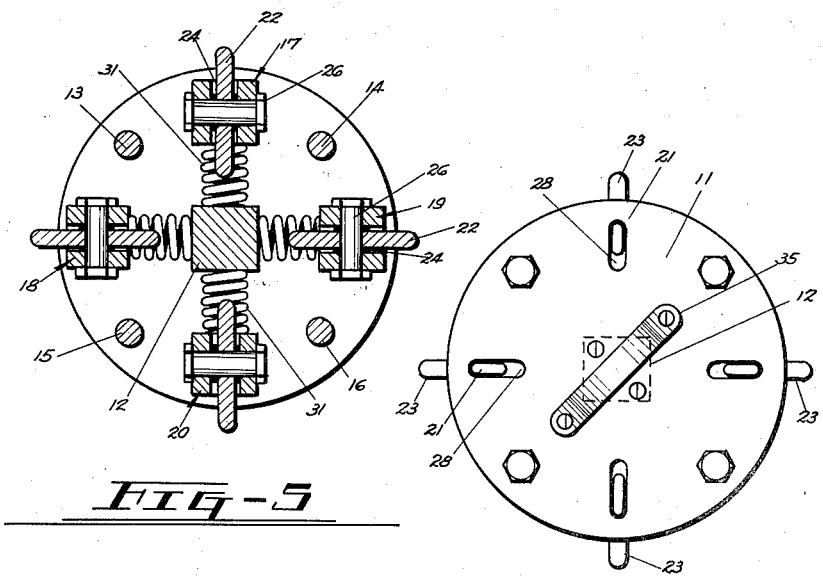
FIG-5
FIG-6
INVENTOR
Joseph Eugene Dufresne
by
E. M. Fetherstonhaugh
ATTORNEY Patented July 18, 1950

2,515,953

UNITED STATES PATENT OFFICE 2,515,953

RODDING MACHINE

Joseph Eugene Dufresne, Beaconsfield, Quebec, Canada

Application January 8, 1947, Serial No. 720,842

2 Claims. (Cl. 104—138)

The invention relates to improvements in rodding machines, as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to provide a rodding machine which will facilitate leading flexible rods, wires and the like, through any length of tubing, piping or ducts; to devise a rodding machine adapted to travel through tubing or piping, having bends in same, or consisting of elbows and the like; to construct a rodding machine which may be driven through tubing or piping by any pressure means such as air pressure, hydraulic pressure and the like; to provide a rodding machine simple in construction and inexpensive to manufacture; to facilitate the threading of wiring through conduit pipes in buildings and underground; to provide a rodding machine in which the various parts are readily accessible for inspection or repair; to devise a rodding machine which is simple and easy to operate; and generally to provide a rodding machine which will be durable and efficient for its purpose.

In the drawings:

Figure 1 is a part side sectional view showing the rodding machine ready for use in a tube.

Figure 2 is a sectional view as taken on the line 2—2 in Figure 1.

Figure 3 is a sectional view as taken on the line 3—3 in Figure 1.

Figure 4 is a sectional view of the rodding machine as taken on the line 4—4 in Figure 3.

Figure 5 is a sectional view of the rodding machine as taken on the line 5—5 in Figure 1.

Figure 6 is an end view of the rodding machine as taken on the line 6—6 in Figure 1.

Like numerals of reference indicate corresponding parts in the various figures.

Referring to the drawings, the carrier of the rodding machine consists of the end members as indicated by the numerals 10 and 11. The center support member 12 is secured at each end thereof to the end members 10 and 11, these end members being flat circular discs or plates fitted over each end of the support member and forming the ends of the carrier. The tie rods 13, 14, 15 and 16 are suitably spaced and secured to the end members 10 and 11 near the periphery of same. The center support member 12 in co-operation with the tie rods 13, 14, 15 and 16 provide a rigid frame for the rodding machine.

The outriggers 17, 18, 19 and 20 provide a means of guiding the carrier portion of the rodding machine through ducts, tubes and the like. Each of these outriggers consist of a movable bar 21 which has the wheels 22 and 23 rotatably mounted thereon. The cross-section of the movable bars 21 is of a rectangular shape and has the slots 24 and 25 extending therethrough. The wheels 22 and 23 are rotatably supported within these slots on the pins 26 and 27, respectively.

The movable bars 21 are turned down on each end thereof to form pin-like projections. The ends of these movable bars are supported in the radial slots 28 in the end members 10 and 11, thus permitting the same to move inward and outward with respect to the carrier, but being non-rotatable therein. The lateral pins 29 and 30 are fixedly secured in the inner face of the movable bars 21 towards each end thereof. The compression springs 31 and 32 are held in position on the pins 29 and 30, respectively, and the inner ends of these springs are held substantially in position in the recesses 33 and 34 in the center support member 12. In this manner the movable bars 21 are held in an extreme outward position in the slots 28 in the end members 10 and 11 by means of pressure exerted on same by the compression springs 31 and 32. The compression springs 31 and 32 are of a suitable strength to hold the movable bars 21 in an outward position, and at the same time, permit these movable bars to be retracted inwardly as the wheels of same are subjected to shock and outward pressure as the carrier travels through bends and the like in the ducts.

The end member 11 has the strap 35 attached thereto, thus providing a means for connecting the cord 36 to the carrier of the rodding machine.

The plug member 37 is adapted to be used in co-operation with the carrier of the rodding machine. In this respect the carrier is adapted to travel through tubes, ducts and the like, while the plug member is adapted to fit securely in one end of the same. The end members 10 and 11 must be of sufficiently smaller diameter or area than that of the duct, so as to compensate for the carrier passing through turns in the duct, the space between the end member and the duct being comparatively narrow.

The plug member 37 consists of a resilient plug 38 which may be made of rubber or any other suitable material. The nipple or tubular member 39 which is threaded on both ends thereof.

is adapted to extend through the central portion of the plug 38. The nuts 40 and 41 are threaded on the nipple 39 and engage the outer surfaces of the plug 38. As these nuts are tightened on the nipple 39 the plug 38 is compressed, thus expanding the same diametrically so as to substantially grip the inner wall of the tube 42.

The nipple 39 is connected to the pressure tank 43 by means of the hose connection 44.

The small tube 45 extends through the lower portion of the plug 38 and provides an aperture through which the cord 36 passes. The cord 36 may be of any suitable length and connected to the flexible rod or wire 46.

In the operation of the invention the flexible rod or wire which is destined to be accommodated in the tube or duct is connected to a suitable length of cord 36. The valve 47 on the pressure tank 43 is then opened. The pressure from this tank passes through the nipple 39, thus entering the tube or duct 42. As the pressure strikes the carrier of the rodding machine, it forces the same through the tube or duct 42. As the carrier passes through bends and elbows in the duct 42, the wheels 22 and 23 on each of the outriggers 17 follow the inner surface of the walls of the duct at all times.

When the carrier reaches the end of the duct 42 it is removed therefrom and the cord 36 is manually drawn therethrough, thus pulling the flexible rod or wire into the duct.

It will be seen from the foregoing that a device has been provided that will facilitate the placing of flexible rods, wires and the like, within tubes, pipes or ducts having various shaped bends in same.

What I claim is:

1. In a rodding machine, a carrier comprising a center support member, a circular end member fixedly secured to each end of said center support member, tie rods connecting said end members to one another near the periphery thereof, outriggers adapted to guide said carrier through ducts and the like, said circular end members being of sufficiently smaller diameter than that of the duct adapting the members to pass through turns therein, each of said outriggers consisting of a bar adapted to move radially of the duct, a pair of wheels rotatably supported in each of said bars, pin-like projections on each end of said bars engaging in radial slots in each of said end members and being movable therein, permitting each of said bars to move inward and outward with respect to said center support member but being non-rotatable in the slots, a compression spring located between said center support members and each of said outriggers adjacent the ends thereof, one end of said spring being contained in a recess in said center support member, a pin extending outward from said outrigger adapted to hold the other end of said spring in abutment with said outrigger, said compression springs extending outward from said center support and adapted to exert outward pressure on said outriggers, and a cord being connected to said carrier and to a length of flexible rod.

2. In a rodding machine, a carrier comprising a longitudinal center support member, end members fixedly secured to said longitudinal center support member, each of said end members comprising a flat circular disc fitted over each end of said support member, tie rods connected to said end members near the periphery thereof, outriggers adapted to guide said carrier through ducts and the like, each of said outriggers consisting of a movable bar, said movable bar having a pair of slots in the same, wheels rotatably mounted in the slots in said movable bars, pin-like projections on each end of said movable bar adapted to be movably supported in radial slots in said end members, thus permitting said movable bar to move inward and outward with respect to said longitudinal center support member and radially of the duct, said pin-like projections being so dimensioned as to prevent rotation in the slots of said bars, compression springs located between said longitudinal center support member and said movable bars and being in abutment therewith and adapted to exert lateral outward pressure on each of said movable bars, said movable bars being normally parallel with respect to said longitudinal center support member and simultaneously parallel with one another, each of said end members being of a sufficiently smaller area than that of the duct adapting the end members to pass through turns in the duct, a strap attached to one of said end members, and a cord connected to said strap and adapted to lead a flexible rod through the ducts accommodating said carrier.

JOSEPH EUGENE DUFRESNE.

REFERENCES CITED

The following references are of record in the file of this patent:

UNITED STATES PATENTS

| Number | Name | Date |
| --- | --- | --- |
| 252,956 | Loane | Jan. 31, 1882 |
| 443,823 | Cope | Dec. 30, 1890 |
| 1,620,788 | Thompson | Mar. 15, 1927 |
| 1,827,239 | Kelley | Oct. 13, 1931 |
| 1,851,435 | Jessup | Mar. 29, 1932 |